United States Patent [19]

Bergervoet et al.

[11] Patent Number: 5,239,238
[45] Date of Patent: Aug. 24, 1993

[54] ELECTRODELESS LOW-PRESSURE MERCURY VAPOUR DISCHARGE LAMP

[75] Inventors: Jozef R. M. Bergervoet; Franciscus A. S. Ligthart, both of Eindhoven, Netherlands

[73] Assignee: U.S. Philips Corporation, New York, N.Y.

[21] Appl. No.: 870,658

[22] Filed: Apr. 20, 1992

[30] Foreign Application Priority Data

May 8, 1991 [EP] European Pat. Off. ............ 91201106

[51] Int. Cl.⁵ .......................................... H05B 41/00
[52] U.S. Cl. .................................... 315/248; 315/56; 315/85; 315/344
[58] Field of Search ............. 315/85, 248, 344, 227 R, 315/242, 56

[56] References Cited

U.S. PATENT DOCUMENTS

| | | | |
|---|---|---|---|
| 4,189,661 | 2/1980 | Haugsjaa et al. | 315/248 X |
| 4,266,167 | 5/1981 | Proud et al. | 315/248 |
| 4,480,213 | 10/1984 | Lapatovich et al. | 315/248 |
| 4,568,859 | 2/1986 | Houkes et al. | 315/248 |
| 4,645,967 | 2/1987 | Bouman et al. | 315/344 X |
| 4,710,678 | 12/1987 | Houkes et al. | 315/39 |
| 5,065,075 | 11/1991 | Greb | 315/248 |

Primary Examiner—David Mis
Attorney, Agent, or Firm—Brian J. Wieghaus

[57] ABSTRACT

An electrodeless low-pressure mercury vapor discharge lamp whose discharge vessel is provided with a core of magnetic material and a coil surrounding the core which coil connected to a high-frequency supply unit. An interference-suppressing, light transmissive electrically conductive layer is present on the outside of the discharge vessel, which layer can be connected to the supply mains through an electric conductor. The electric conductor comprises one or several capacitors connected in series to keep the conducting layer safe to touch during operation.

20 Claims, 1 Drawing Sheet

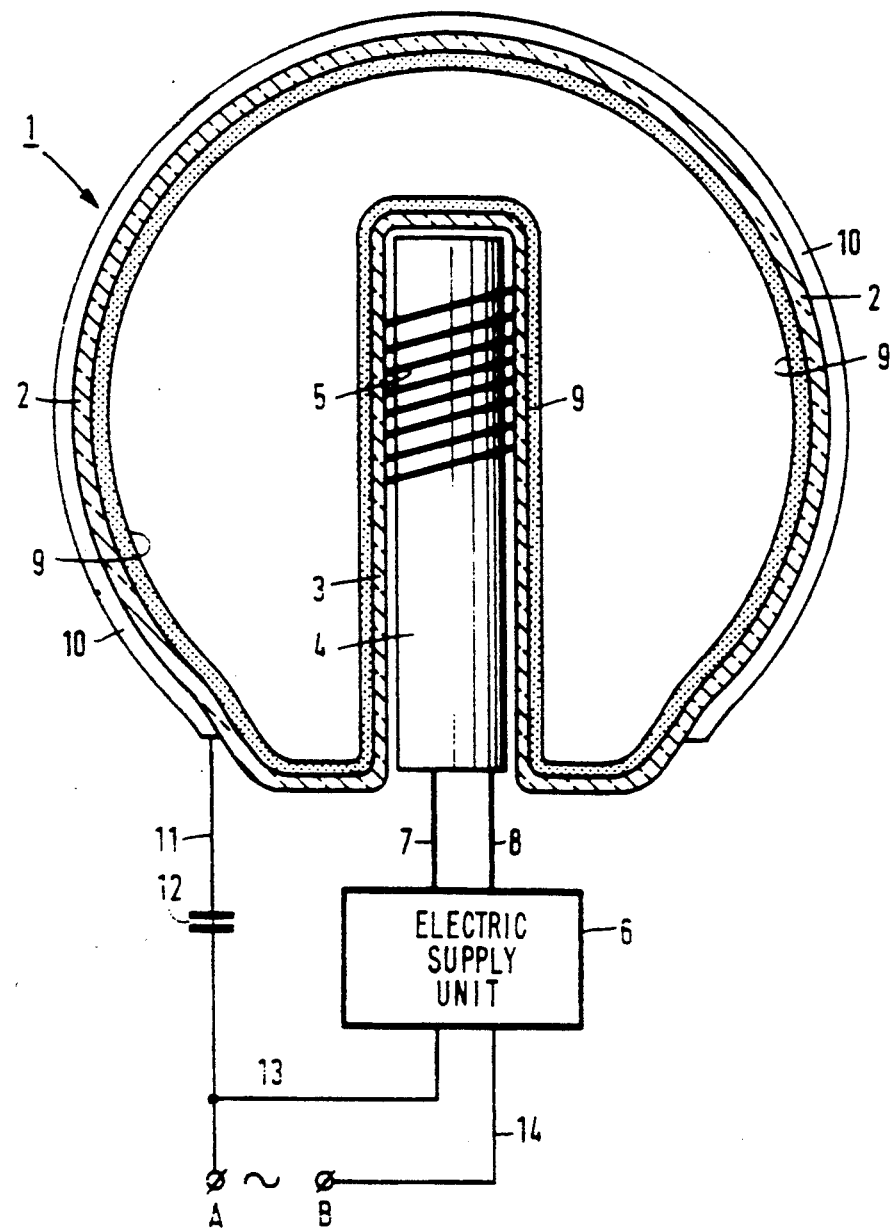

ELECTRODELESS LOW-PRESSURE MERCURY VAPOUR DISCHARGE LAMP

BACKGROUND OF THE INVENTION

The invention relates to an electrodeless low-pressure mercury vapor discharge lamp having a closed discharge vessel which contains mercury and rare gas and is provided with a core of magnetic material and with a coil provided around the core, which coil is connected to a high-frequency supply unit, a wall of the discharge vessel situated around the discharge being provided with an interference-suppressing, transparent, electrically conductive layer which can be connected through an electric conductor to one of the two poles of the supply mains.

A lamp of the kind indicated is known from U.S. Pat. No. 4,568,859.

In the known lamp, the core of magnetic material and the surrounding coil are accommodated in a cavity in the discharge vessel. The transparent electrically conducting layer is present on the inside wall of the discharge vessel. The electric conductor connected to the conducting layer is passed to the exterior through the wall of the discharge vessel and connected to one of the poles of the supply mains during lamp operation. It is achieved in this way that high-frequency interferential electric fields outside the lamp are reduced to an acceptable level.

A problem in the known lamp is the lead-through of the electric conductor through the wall of the discharge vessel. Such a lead-through renders the construction of the lamp intricate and expensive. In addition, stresses can easily arise during lamp operation in the glass at the area of the lead-through as a result of differences in the coefficients of expansion of the materials used. The risk of leaks in the discharge vessel is therefore by no means imaginary.

SUMMARY OF THE INVENTION

The invention has for its object to provide an improved electrodeless low-pressure mercury vapor discharge lamp which is of a simple and reliable construction.

To achieve the envisaged object, an electrodeless low-pressure mercury vapor discharge lamp of the kind indicated in the opening paragraph is characterized in that the electrically conductive layer is present on the outside wall of the discharge vessel and a capacitance is connected in series with the electric conductor in order to keep the electrically conductive layer safe to touch during operation. The capacitance may be comprised by one or more capacitor components.

It is achieved by this that a lead-through is avoided and that the lamp can at the same time be safely touched by hand.

The impedance of a capacitor is $$\frac{1}{2\pi f C}$$

In which f=frequency and C=capacitance of the capacitor. Seen from the live terminal of the supply mains (f=50 Hz or 60 Hz), the capacitor in the electric conductor represents a comparatively high impedance, so that upon touching of the electrically conductive layer the current through the capacitor and the conductive layer is comparatively small. Seen from the electrically conductive layer, in which high-frequency (for example, f=2.65 MHz) interferential currents are generated, the capacitor forms a low impedance, so that these interference currents can easily be drained off to the supply mains.

A favorable embodiment of an electrodeless low-pressure mercury vapor discharge lamp according to the invention is characterized in that the total capacitance of the capacitor or capacitors is at most 5,000 pF.

This takes into account the standard that a current strength of at most 0.5 mA is still safe to touch.

The invention will be explained in more detail with reference to a drawing.

BRIEF DESCRIPTION OF THE DRAWING

The FIGURE diagrammatically shows in cross-section and not true to scale an electrodeless low-pressure mercury vapor discharge lamp having an external electrically conductive coating and a capacitor connected thereto in accordance with the invention.

DESCRIPTION OF THE PREFERRED EMBODIMENTS

In the FIGURE, the lamp includes glass discharge vessel 1 which is closed in a gastight manner and contains mercury and rare gas. The discharge vessel 1 has a bulb 2 and a cavity 3 formed by an inwardly extending protrusion of the wall of the discharge vessel. In the cavity 3 are arranged a rod-shaped core 4 of magnetic material (ferrite) and a coil 5 provided around the core and connected to a high-frequency electric supply unit 6 through supply wires 7 and 8. The electric high-frequency supply unit 6 contains an electric circuit, for example, such as described in the Netherlands Patent Application 8004175 which corresponds to U.S. Pat. No. 4,415,838 laid open to public inspection.

At the inside of the discharge vessel 1, on the wall of the bulb 2 and the cavity 3, there is present a luminescent layer 9, for example, consisting of a mixture of three luminescent materials: red-luminescing yttrium oxide activated by trivalent europium, green-luminescing cerium-magnesium aluminate activated by trivalent terbium, and blue-luminescing barium-magnesium aluminate activated by bivalent europium.

A transparent electrically conductive layer 10 is provided on the outside of the bulb 2, which layer consists of, for example, tin-doped indium oxide which can be connected to terminal A of the supply mains (zero lead or live lead) via an electric conductor 11, in which a capacitor 12 is included. The electric supply unit 6 can be connected to the terminals A and B of the supply mains through conductors 13 and 14.

During lamp operation a high-frequency magnetic field is generated by the coil 5 in the core 4 of magnetic material. The electric field induced in the discharge vessel 1 by the magnetic field ensures that a mercury discharge is maintained inside the discharge vessel, whereby ultraviolet radiation is generated. This ultraviolet radiation is for the major part converted into visible radiation by the luminescent layer 9.

High-frequency interferential radiation issuing from the discharge vessel 1 to the exterior results in high-frequency interferential currents in the transparent electrically conductive layer 10. Since the capacitor 12 in the electric conductor 11 connected to the conductive layer 10 presents a low impedance to these high-frequency interferential currents, the said interference currents are drained off to terminal A of the supply mains. Capacitor 12 further has such a capacitance that the impedance of the capacitor, seen from the mains, is high for the mains frequency upon touching of the electrically conductive layer 10. No more than a small current, which is safe to touch, will then flow from the mains live terminal through the capacitor 12 and the electrically conductive layer 10.

If the single-wound coil 5 as shown is used, the electrically conductive layer 10 in practice has a square resistance $R_\square$ of between 10 and 100 ohms. A value of, for example, 1,000 pF may then be chosen for the capacitor 12. It is also possible to connect two capacitors in series, which then each have a value of 2,000 pF.

If a coil with a double winding is used, as known from FIG. 2 of U.S. Pat. No. 4,710,678, less interference radiation will occur. The electrically conductive layer 10 can then be of a thinner construction and as a result has a higher square resistance value $R_\square$, for example between 100 and 1000 ohms. In that case, the capacitor 12 may have a capacitance of, for example, 100 pF, or two capacitors in series may be used, each having a capacitance of 200 pF.

In all cases, the total capacitance value does not exceed 5,000 pF in order to guarantee the safety margin of at most 0.5 mA.

In the drawing, the capacitor 12 is connected directly to the supply mains. It is obviously also possible to connect the capacitor 12 indirectly to the supply mains, via a suitable point of the electric supply unit 6.

We claim:

1. An electrodeless low-pressure mercury vapor discharge lamp having a closed discharge vessel which contains mercury and rare gas and in which a gas discharge is maintained during lamp operation, said discharge vessel including an inwardly extending protrusion defining a cavity in said discharge vessel, a core of magnetic material, a coil arranged around said core, said coil and core being disposed within said cavity, a wall of the discharge vessel situated around the discharge being provided with an interference-suppressing, light transmissive, electrically conductive layer and an electric conductor for connecting said layer to one of the two poles of a supply mains, characterized in that:
   the electrically conductive layer is present on the outside wall of the discharge vessel and a capacitance is connected in series with the electric conductor in order to keep the electrically conductive layer safe to touch during operation.

2. An electrodeless low-pressure mercury vapor discharge lamp as claimed in claim 1, characterized in that the total capacitance of the capacitor or capacitors is at most 5,000 pF.

3. An electrodeless low-pressure mercury vapor discharge lamp as claimed in claim 2, wherein said capacitance is comprised by a capacitor component.

4. An electrodeless low-pressure mercury vapor discharge lamp as claimed in claim 1, wherein said capacitance is comprised by a capacitor component.

5. An electrodeless discharge lamp, comprising:
   a) a discharge vessel sealed in a gas-tight manner and containing a discharge sustaining filling, said discharge vessel including an outer surface;
   b) generating means for generating a high frequency magnetic field within said discharge vessel for supporting a discharge in said discharge sustaining filling during lamp operation;
   c) a light-transmissive, electrically conductive layer on said outer surface of said discharge vessel for suppressing the escape from said discharge vessel of the high frequency magnetic field generated by said generating means; and
   d) connecting means for connecting said electrically conductive layer to a pole of a supply mains, said connecting means including a capacitance selected such that said electrically conductive layer is safe to touch during lamp operation and is effective for suppressing the escape of high frequency magnetic fields from said discharge vessel.

6. An electrodeless discharge lamp according to claim 5, wherein said connecting means includes an electric conductor and a capacitor component.

7. An electrodeless discharge lamp according to claim 6, wherein said means for generating a high frequency magnetic field within said discharge vessel comprises said discharge vessel having an inwardly extending protrusion defining a cavity within said discharge vessel, a core of magnetic material within said cavity, and a coil within said cavity and arranged around said core.

8. An electrodeless discharge lamp according to claim 7, wherein said means for generating a high frequency magnetic field further includes an electric circuit integral with said lamp and connected to said coil for generating a high frequency signal in said coil.

9. An electrodeless discharge lamp according to claim 8, wherein said capacitance is less than or equal to about 5,000 pF.

10. An electrodeless discharge lamp according to claim 9, wherein said electrically conductive layer has a square resistance of between about 10 and 1000 ohms.

11. An electrodeless discharge lamp according to claim 10, wherein said electrically conductive layer has a square resistance of between about 10 and 100 ohms and said capacitance has a value of about 1000 pF.

12. An electrodeless discharge lamp according to claim 10, wherein said electrically conductive layer has a square resistance of between about 100 and 1000 ohms and said capacitance has a value of about 100 pF.

13. An electrodeless discharge lamp according to claim 10, wherein said electrodeless discharge lamp is a low pressure mercury vapor discharge lamp and said discharge sustaining filling includes mercury and a rare gas.

14. An electrodeless discharge lamp according to claim 5, wherein said means for generating a high frequency magnetic field within said discharge vessel comprises said discharge vessel having an inwardly extending protrusion defining a cavity within said discharge vessel, a core of magnetic material within said cavity, and a coil within said cavity and arranged around said core.

15. An electrodeless discharge lamp according to claim 14, wherein said means for generating a high frequency magnetic field further includes an electric circuit integral with said lamp and connected to said coil for generating a high frequency signal in said coil.

16. An electrodeless discharge lamp according to claim 5, wherein said capacitance is less than or equal to about 5,000 pF.

17. An electrodeless discharge lamp according to claim 16, wherein said electrically conductive layer has a square resistance of between about 10 and 1000 ohms.

18. In combination, an electrodeless discharge lamp and a high frequency supply circuit, said combination comprising:
   a) an electrodeless discharge lamp, said discharge lamp comprising
      i) a discharge vessel having a wall with an outer surface and sealed in a gas-tight manner, said wall including an inwardly extending protrusion defining a cavity within said discharge vessel,
      ii) a discharge sustaining filling within said discharge vessel, a core of magnetic material and a coil coiled about said core, said core and said coil being disposed within said cavity, and
      iii) an interference suppressing, light transmissive, electrically conductive layer on said outer surface of said discharge vessel;
   b) a high frequency electric supply circuit for supplying a high frequency signal to said coil in said lamp, said circuit generating a signal such that said coil generates a high frequency magnetic field within said discharge vessel and supports a discharge in said discharge sustaining filling; and
   c) connecting means for connecting said electrically conductive layer to a pole of a power supply mains, said connecting means including a capacitance selected such that said layer is safe to touch during lamp operation.

19. The combination of claim 18, wherein said high frequency supply circuit includes a pair of inputs for connection to the poles of a mains power supply, and said connecting means includes (i) an electric conductor connected to one of said inputs and said layer, and (ii) a capacitor component connected in series with said conductor.

20. The combination of claim 18, wherein said capacitance is less than or equal to about 5,000 pF.

* * * * *